(12) United States Patent
Repka

(10) Patent No.: US 7,197,184 B2
(45) Date of Patent: Mar. 27, 2007

(54) ZHUYIN SYMBOL AND TONE MARK INPUT METHOD, AND ELECTRONIC DEVICE

(75) Inventor: Mikko Repka, Oulu (FI)

(73) Assignee: Nokia Corporation, Espoo (FI)

( * ) Notice: Subject to any disclaimer, the term of this patent is extended or adjusted under 35 U.S.C. 154(b) by 39 days.

(21) Appl. No.: 10/954,402

(22) Filed: Sep. 30, 2004

(65) Prior Publication Data

US 2006/0066618 A1    Mar. 30, 2006

(51) Int. Cl.
*G06K 9/18*    (2006.01)
*H04Q 7/20*    (2006.01)
*H04L 29/08*   (2006.01)

(52) U.S. Cl. ............... 382/185; 455/466; 455/414.4

(58) Field of Classification Search ............. 345/467, 345/947, 948; 455/566, 466, 414.4; 382/185, 382/290
See application file for complete search history.

(56) References Cited

U.S. PATENT DOCUMENTS 6,005,549 A * 12/1999 Forest ................. 345/157
6,009,444 A * 12/1999 Chen .................. 715/535
6,487,424 B1 * 11/2002 Kraft et al. ............ 455/566
6,809,725 B1 * 10/2004 Zhang ................. 345/171
6,822,585 B1 * 11/2004 Ni et al. ............... 341/28
6,847,311 B2 * 1/2005 Li ..................... 341/28
2003/0184451 A1 * 10/2003 Li ..................... 341/22
2005/0027534 A1 * 2/2005 Meurs et al. ............ 704/270
2005/0057512 A1 * 3/2005 Du et al. .............. 345/168

* cited by examiner

*Primary Examiner*—Kee M. Tung
*Assistant Examiner*—Michelle K. Lay
(74) *Attorney, Agent, or Firm*—Hollingsworth & Funk, LLC

(57) ABSTRACT

A method for entering ZhuYin symbols and tone marks into electronic text is provided. The method comprises receiving an input symbol and providing a candidate list comprising the input symbol and the Chinese characters associated with the input symbol. After the selection of the input symbol from the candidate list, the selected input symbol is entered to the electronic text, and the tone marks of the ZhuYin symbol set are provided. After the selection of a tone mark, the selected tone mark is entered to the electronic text.

9 Claims, 3 Drawing Sheets

ZHUYIN SYMBOL AND TONE MARK INPUT METHOD, AND ELECTRONIC DEVICE

FIELD

The invention relates to entering ZhuYin symbols and tone marks into electronic text.

BACKGROUND

When entering electronic text in English, the user can enter one character with one key press. In Chinese text, however, a number of key presses are required to identify one character. This is why methods for entering electronic text in Chinese are somewhat distinct from methods for entering English text. Most input editors provide a predictive, associative input method. The user enters the input symbol or symbols describing the character to be entered. The input editor provides a candidate list comprising the characters associated with the input symbol or symbols. The user can then select the desired character from the candidate list. The input editor may also provide a feature, in which, once the first character is selected, the next probable character (or in some cases the whole word or phrase) is displayed. Word association can be quite useful as Chinese words often consist of two characters, and it helps to predict a second character once the first character is entered.

Chinese input methods can be approximately categorized into four types: phonetic, shape, semantic, and code input method. ZhuYin input method is a phonetic input method based on the Chinese phonetic system called BoPoMoFo. The ZhuYin input method is designed especially for entering characters of Mandarin Chinese, and the method is mainly used in Taiwan. According to the ZhuYin method, Chinese characters are built from defined symbols. There are 37 ZhuYin symbols representing vowels and consonants, each describing a certain sound. In addition to symbols, there are five tone marks representing the intonation of the character described by the symbols. The maximum number of symbols describing a Chinese character is three plus a tone mark. When entering electronic text, the symbols and tone marks are entered using a keyboard or corresponding input realization. The input editor incorporates an engine which associates the entered symbols to Chinese characters and provides a candidate list comprising the Chinese characters corresponding to the pronunciation described by the entered symbols. If the engine can recognise the entered string, i.e. the tone mark is added into a valid ZhuYin string, candidates are shown in the candidate list. Otherwise, the candidate list is empty.

ZhuYin symbols and tone marks were originally designed only for creating Chinese characters. Nowadays, however, ZhuYin symbols associated with tone marks exist as part of "e-language" or "chat-language" in Taiwan's Internet community. Their use is similar to the English language's "chat behaviour": 4 u means "for you", 2 b means, "to be" and so on. Entering the ZhuYin symbols and tone marks into electronic text requires, however, a special kind of user interface, since the ZhuYin symbols and tone marks were not originally designed to be inserted into text.

BRIEF DESCRIPTION OF THE INVENTION

An object of the invention is to provide an improved method for entering ZhuYin symbols and tone marks into electronic text, an improved electronic device configured to enter ZhuYin symbols and tone marks into electronic text, an improved user interface for entering ZhuYin symbols and tone marks into electronic text, an improved computer program product encoding a computer program of instructions for executing a computer process for entering ZhuYin symbols and tone marks into electronic text, and an improved computer program distribution medium readable by a computer and encoding a computer program of instructions for executing a computer process for entering ZhuYin symbols and tone marks into electronic text.

According to an embodiment of the invention, there is provided a method for entering ZhuYin symbols and tone marks into electronic text, the method comprising: receiving a ZhuYin symbol input from the user interface of an electronic device; providing in a display unit of the electronic device a candidate list comprising the input ZhuYin symbol along with a Chinese character candidate list associated with the ZhuYin symbol input from the user interface; receiving an input from the user interface, the input being related to the selection of the ZhuYin symbol included in the candidate list; entering into electronic text the ZhuYin symbol based on the ZhuYin symbol selection input from the user interface; providing in the display unit of the electronic device the tone marks of the ZhuYin symbol set; receiving the tone mark selection input from the user interface; entering into electronic text, a tone mark associated with the selected ZhuYin symbol, based on the tone mark selection input from the user interface.

According to another embodiment of the invention, there is provided an electronic device comprising: an input device for inputting information; a display unit for displaying information; a control unit operationally connected to the input device and the display unit, the control unit being configured to: receive a ZhuYin symbol input from the input device; provide in the display unit a candidate list comprising the input ZhuYin symbol along with a Chinese character candidate list associated with the ZhuYin symbol; receive an input from the input device, the input being related to the selection of the ZhuYin symbol included in the candidate list; enter into electronic text the ZhuYin symbol based on the ZhuYin symbol selection input from the input device; provide in the display unit the tone marks of the ZhuYin symbol set; receive a tone mark selection input from the input device; enter into electronic text a tone mark associated with the selected ZhuYin symbol, based on the tone mark selection input from the input device.

According to yet another embodiment of the invention, there is provided a user interface for entering ZhuYin symbols and tone marks into electronic text, the user interface comprising: an input device for inputting information; a display unit for displaying information; a control unit operationally connected to the input device and the display unit, the control unit being configured to: receive a ZhuYin symbol input from the input device; provide in the display unit a candidate list comprising the input ZhuYin symbol along with a Chinese character candidate list associated with the ZhuYin symbol; receive an input being related to the selection of the ZhuYin symbol included in the candidate list; provide in the display unit the tone marks of the ZhuYin symbol set; receive a tone mark selection input from the input device.

According to yet another embodiment of the invention, there is provided a computer program product encoding a computer program of instructions for executing a computer process for entering ZhuYin symbols and tone marks in electronic text, the process comprising: receiving a ZhuYin symbol input from the user interface of the electronic device; providing in a display unit of the electronic device a candidate list comprising the input ZhuYin symbol along with a Chinese character candidate list associated with the ZhuYin symbol input from the user interface; receiving an input from the user interface, the input being related to the selection of the ZhuYin symbol included in the candidate list; entering into electronic text the ZhuYin symbol based on the ZhuYin symbol selection input from the user interface; providing in the display unit of the electronic device the tone marks of the ZhuYin symbol set; receiving the tone mark selection input from the user interface; entering into electronic text a tone mark associated with the selected ZhuYin symbol, based on the tone mark selection input from the user interface.

According to yet another embodiment of the invention, there is provided a computer program distribution medium readable by a computer and encoding a computer program of instructions for executing a computer process for entering ZhuYin symbols and tone marks into electronic text, the process comprising the following steps: receiving a ZhuYin symbol input from the user interface of the electronic device; providing in a display unit of the electronic device a candidate list comprising the input ZhuYin symbol along with a Chinese character candidate list associated with the ZhuYin symbol input from the user interface; receiving an input from the user interface, the input being related to the selection of the ZhuYin symbol included in the candidate list; entering into electronic text the ZhuYin symbol based on the ZhuYin symbol selection input from the user interface; providing in the display unit of the electronic device the tone marks of the ZhuYin symbol set; receiving the tone mark selection input from the user interface; entering into electronic text a tone mark associated with the selected ZhuYin symbol, based on the tone mark selection input from the user interface.

The invention provides several advantages. "E-chat" strings, comprising a ZhuYin symbol associated with a tone mark, can be added in the same manner as normal Chinese characters and words. Thus, there is no need to learn different ways to input text and text strings. Typing text with "e-chat" strings is also faster and more convenient for a user, since the same keyboard layout may be used for writing text and the "e-chat" strings. There is no need to, for example, change to a special keyboard layout, when adding "e-chat" strings.

LIST OF DRAWINGS

In the following, the invention will be described in greater detail with reference to the embodiments and the accompanying drawings, in which FIG. 1 shows an example of the structure of an electronic device used for editing electronic text in Chinese;

DESCRIPTION OF EMBODIMENTS

Figure 1:
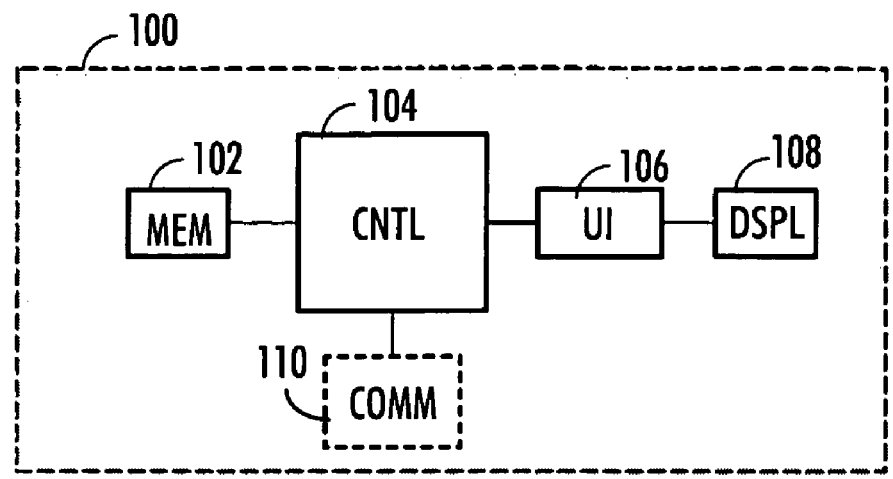

FIG. 1 illustrates an example of the structure of an electronic device 100 used for editing electronic text in Chinese. The electronic device 100 may be for example a computer, a laptop, a PDA (Personal Digital Assistant) or a mobile communication device. The electronic device 100 may also be a combination of two electronic devices, such as a computer with a mobile communication device connected to the computer. An example of a combination of a PDA and a mobile communication device is the Nokia Communicator®.

The electronic device 100 comprises a control unit 104 controlling the operation of the electronic device 100. The control unit 104 may be implemented with a digital signal processor with suitable software or with separate logic circuits, for example with ASIC (Application Specific Integrated Circuit).

The electronic device 100 further comprises a user interface 106 connected to the control unit 104. The user interface 106 may comprise at least one display unit 108 for displaying information. The user interface 106 may also comprise a keyboard or another user input device. The user interface 106 may also be implemented with a touch sensitive display.

The electronic device 100 further comprises a memory unit 102 to store data required for the operation of the electronic device 100. The memory unit 102 may store applications used in the electronic device 100 but also any information input to the electronic device 100.

The electronic device 100 may also comprise a communication unit 110 to communicate with other electronic devices. The communication unit 110 may transmit and receive information using a wireless communication system, such as GSM (Global System for Mobile Communications), UMTS (Universal Mobile Telecommunications System), Bluetooth®, or WLAN (Wireless Local Area Network). Alternatively, the electronic device may be connected to a fixed network, such as Ethernet.

Figure 2:
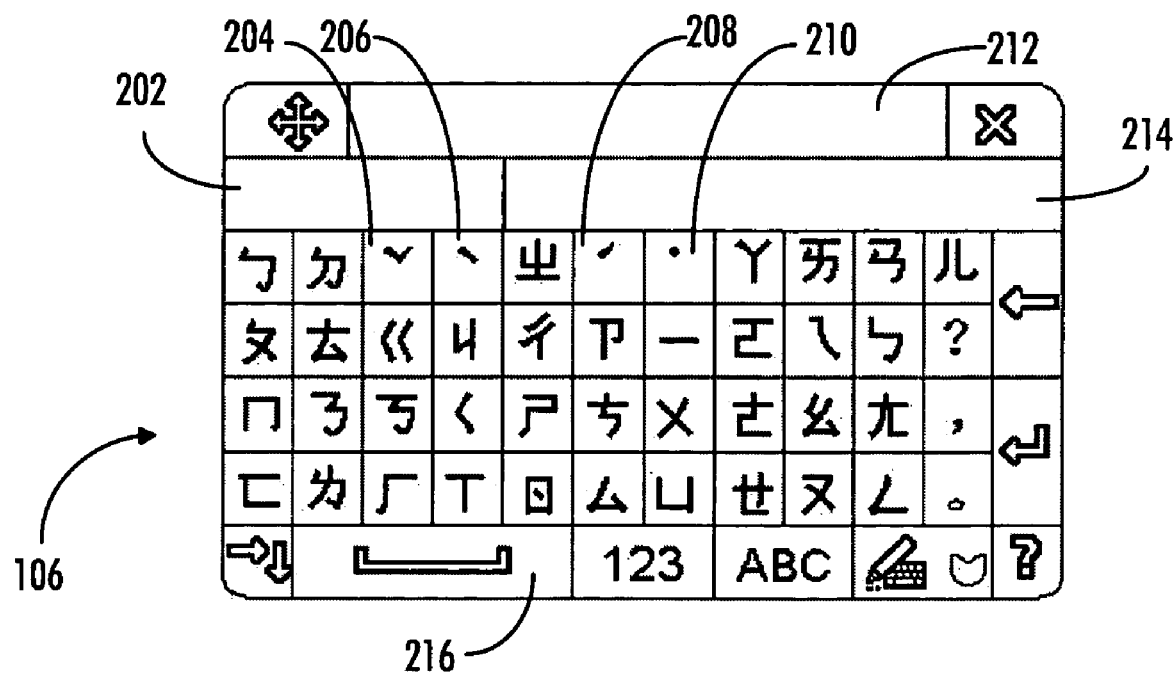
FIG. 2 illustrates an example of the user interface of the electronic device.

FIG. 2 shows an example of the user interface 106 of the electronic device 100. In this example, the user interface 106 comprises a touch sensitive display. The user interface 106 may also comprise other components, such as a loudspeaker and a microphone, but they are omitted from this example for the sake of clarity. Though a touch sensitive display is used in this example as a user interface, it should be appreciated that user interfaces of other types are also possible.

The keyboard layout of the user interface 106 comprises the 37 ZhuYin symbols in addition to four tone marks 204 to 210. The fifth tone mark may be entered using for example the space bar 216 after entering one to three ZhuYin symbols as required by the ZhuYin input method.

Entering a character into electronic text comprises displaying the character in the display unit 108 as part of electronic text, and storing the character in the memory unit 102 of the electronic device 100.

In addition to the keyboard layout, the user interface 106 also comprises an input field 202, where the entered ZhuYin symbols and tone marks are displayed in the order that they are entered. It may also be possible to edit the symbol string in the input field. Symbols in the input field may be deleted and new symbols added between the symbols in the string.

A candidate list comprising the Chinese characters associated with the input symbols is displayed in the candidate list field 214. The candidate list is updated automatically when more symbols are inserted to the input field. The best matching candidate may be placed on the leftmost placeholder and the next best match next to that and so on. The best matching candidate may also be highlighted. If the input field and text field are empty, the candidate list is empty as well. The desired character may be selected from the candidate list by clicking the particular character, or by moving a cursor over the character and clicking a selection button.

The candidate list may comprise a scroll function or a drop-down list in case there are more candidates than can be fit in the field 214.

The characters selected from the candidate list are displayed in the text field 212. The text field 212 may also be editable with at least the basic word processor functions like cut, copy and paste. Characters may also be deleted and new characters added in the middle of the string.

Figure 3A:
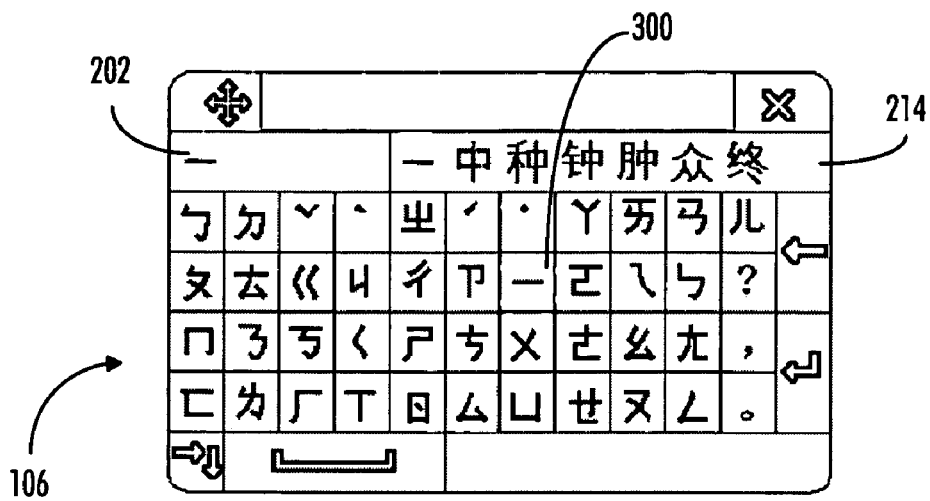
FIGS. 3A to 3C illustrate an example of the process of entering ZhuYin symbols and tone marks into electronic text.
Figure 3B:
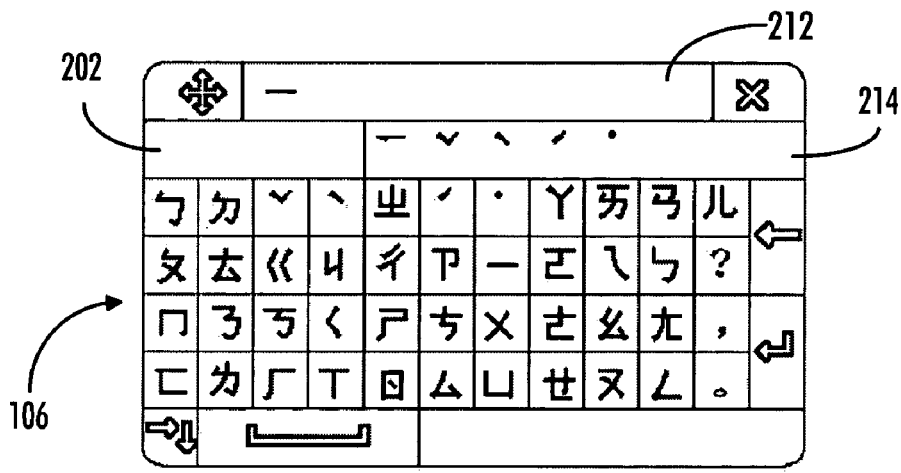
Figure 3C:
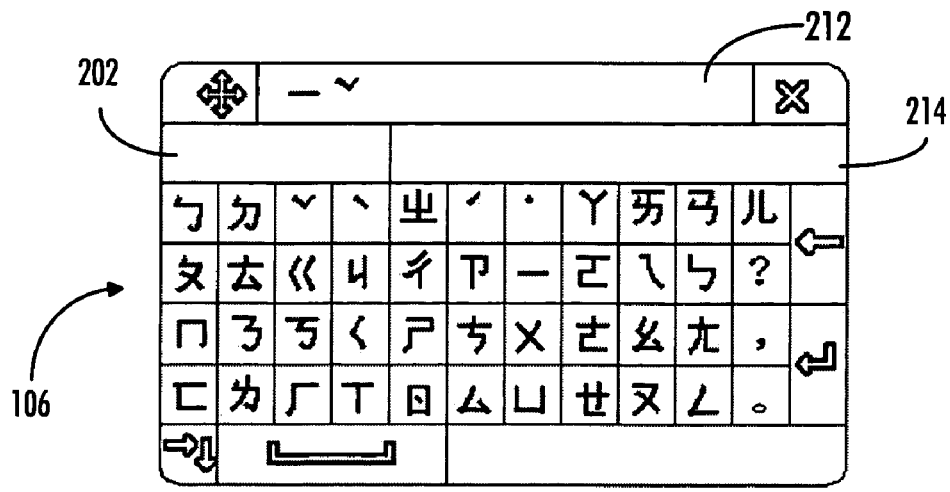

Next, the process of entering ZhuYin symbols and tone marks into the text instead of the Chinese characters is described with reference to the FIGS. 3A to 3C of the user interface 106. First, a ZhuYin symbol 300 may be entered by clicking the symbol 300 in the keyboard layout. The symbol 300 is then displayed in the input field 202, but also in the candidate list field 214 along with the Chinese characters associated with the symbol 300. The ZhuYin symbol may be the first symbol in the candidate list, as illustrated in FIG. 3A.

The ZhuYin symbol 300 may then be selected from the candidate list and, as a result, the symbol is moved to the text field 212. The candidate list field 214 is cleared of the Chinese characters and, instead, the tone marks are provided in the user interface 106. The tone marks may be provided in the candidate list field 214, as illustrated in FIG. 3B, or they can be selected directly from the keyboard layout. The keyboard layout may be the same as used for entering ZhuYin symbols, or a special keyboard layout comprising the tone marks may also be used. A new window with a layout comprising the tone marks may open automatically after the selection of the ZhuYin symbol. Desired tone mark may then be selected. The selected tone mark is usually associated with the previously selected ZhuYin symbol 300, but the two symbols may also both have a meaning on their own. After the selection of a tone mark, the tone mark is also moved to the text field 212 and the candidate list field 214 may be cleared for the input of the next ZhuYin symbol, as illustrated in FIG. 3C.

The feature of inserting ZhuYin symbols and tone marks into the text may naturally be turned off in the electronic device 100, if necessary. In this case, the input method corresponds to a conventional ZhuYin input method.

Figure 4:
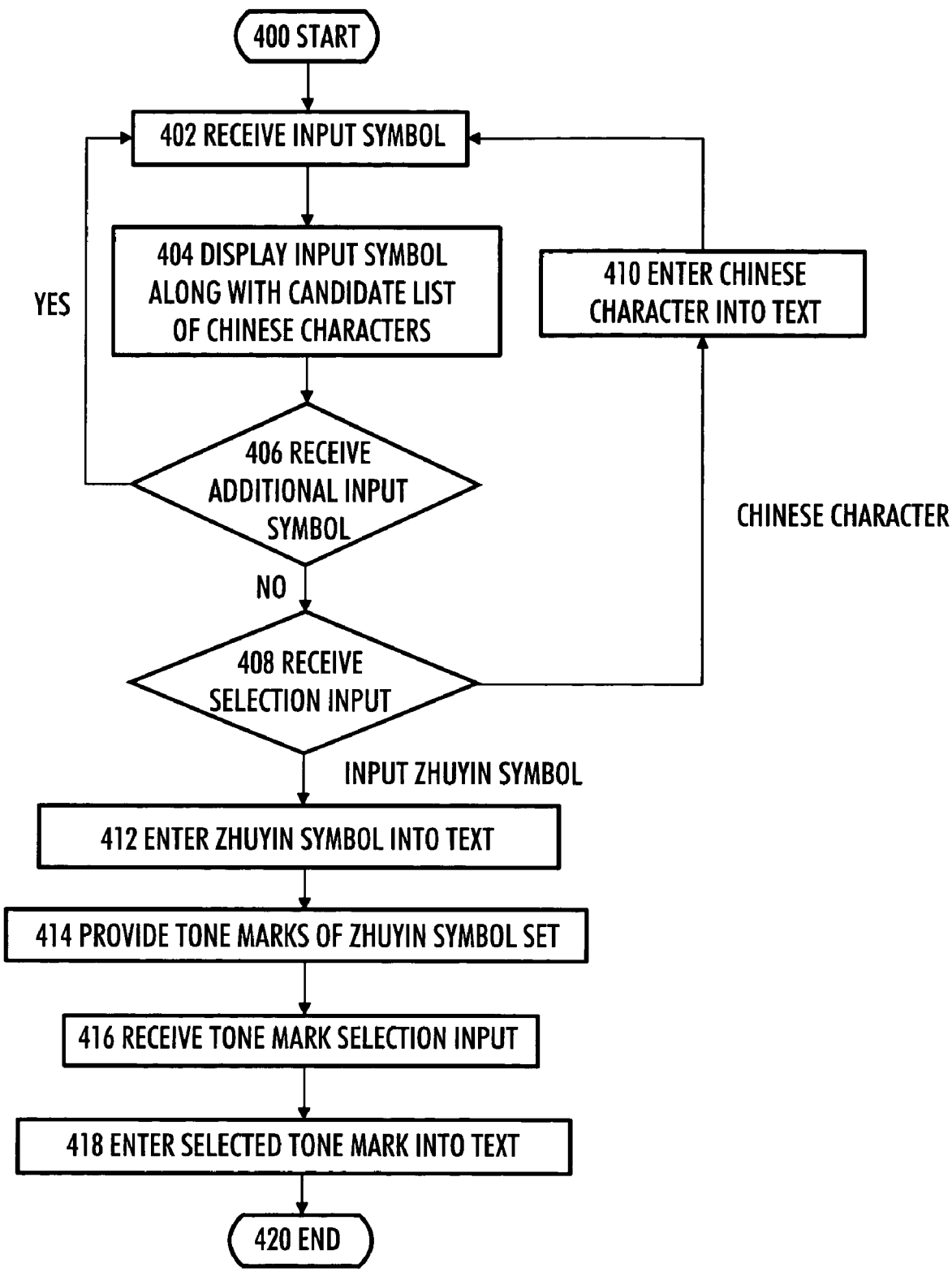
FIG. 4 is a flow chart illustrating an embodiment of the invention.

Next, an example embodiment of the whole process of inputting Chinese characters as well as ZhuYin symbols and tone marks is described with reference to the flow chart in FIG. 4. The process starts in step 400. In step 402, an input symbol is received from the user interface 106 of the electronic device 100. In step 404, the input ZhuYin symbol is displayed in the input field 202 and in the candidate list field 214 of the user interface 106 of the electronic device 100. Along with the ZhuYin symbol, a candidate list of the Chinese characters associated with the ZhuYin symbol is displayed.

A decision of whether to enter another input symbol is made in step 406. If only a single ZhuYin symbol is input so far, the candidate list may comprise hundreds of characters. That is why, if a Chinese character is to be entered, it may be reasonable to input additional ZhuYin symbols that further define the Chinese character to be entered.

If another symbol is chosen to be input in step 406, step 402 is carried out once again, and the newly entered ZhuYin symbol is displayed in the candidate list field 214. Both of the input symbols are, however, displayed in the input field 202.

A maximum of three ZhuYin symbols plus a tone mark may be input in this way. When no additional symbol is chosen to be input in step 406, the process continues in step 408, where the desired character is selected from the candidate list. If a Chinese character is selected, the selected character is entered 410 into the text. The process then moves back to step 402, and the input field 202 and the candidate list field 214 may be cleared for entering new input symbols that define a new character to be entered.

If the ZhuYin symbol is selected from the candidate list instead of a Chinese character in step 408, the selected ZhuYin symbol is entered into the text in step 412. The five tone marks of the ZhuYin symbol set are then provided in the user interface 106 as done in step 414. One tone mark is selected to be associated with the previously selected ZhuYin symbol. The tone mark selection input is received in the electronic device 100 in step 416. In step 418, the selected tone mark is also moved to the text field 212 and stored in the memory unit 102. The process ends in step 420.

The electronic device 100 of the type described above may be used to implement the method, but also other types of electronic devices may be suitable for the implementation. In an embodiment, a computer program product encodes a computer program of instructions for executing a computer process of the above-described method for entering ZhuYin symbols and tone marks into an electronic device. The computer program product may be implemented on a computer program distribution medium. The computer program distribution medium includes all manners known in the art for distributing software, such as a computer readable medium, a program storage medium, a record medium, a computer readable memory, a computer readable software distribution package, a computer readable signal, a computer readable telecommunication signal, and a computer readable compressed software package.

Even though the invention is described above with reference to an example according to the accompanying drawings, it is clear that the invention is not restricted thereto but can be modified in several ways within the scope of the appended claims.

The invention claimed is:

1. A method for entering ZhuYin symbols and tone marks into electronic text, the method comprising:
   receiving a ZhuYin symbol input from the user interface of the electronic device; providing in a display unit of the electronic device a candidate list comprising the input ZhuYin symbol along with a Chinese character candidate list associated with the ZhuYin symbol input from the user interface;
   receiving an input from the user interface, the input being related to the selection of the ZhuYin symbol included in the candidate list;
   entering into electronic text the ZhuYin symbol based on the ZhuYin symbol selection input from the user interface;
   providing in the display unit of the electronic device the tone marks of the ZhuYin symbol set;
   receiving the tone mark selection input from the user interface;
   entering into electronic text, a tone mark associated with the selected ZhuYin symbol, based on the tone mark selection input from the user interface.

2. The method of claim 1, wherein the tone marks of the ZhuYin symbol set are displayed in the candidate list.

3. An electronic device comprising:
   an input device for inputting information;
   a display unit for displaying information;
   a control unit operationally connected to the input device and the display unit, the control unit being configured to:
   receive a ZhuYin symbol input from the input device;

provide in the display unit a candidate list comprising the input ZhuYin symbol along with a Chinese character candidate list associated with the ZhuYin symbol;

receive an input from the input device, the input being related to the selection of the ZhuYin symbol included in the candidate list;

enter into electronic text the ZhuYin symbol based on the ZhuYin symbol selection input from the input device;

provide in the display unit the tone marks of the ZhuYin symbol set;

receive a tone mark selection input from the input device;

enter into electronic text a tone mark associated with the selected ZhuYin symbol, based on the tone mark selection input from the input device.

4. The electronic device of claim 3, wherein the electronic device is a mobile communication device.

5. The electronic device of claim 3, wherein the control unit is configured to display the tone marks of the ZhuYin symbol set in the candidate list.

6. A user interface for entering ZhuYin symbols and tone marks into electronic text, the user interface comprising:
an input device for inputting information;
a display unit for displaying information;
a control unit operationally connected to the input device and the display unit, the control unit being configured to:
receive a ZhuYin symbol input from the input device;
provide in the display unit a candidate list comprising the input ZhuYin symbol along with a Chinese character candidate list associated with the ZhuYin symbol;
receive an input related to the selection of the ZhuYin symbol included in the candidate list;
provide in the display unit the tone marks of the ZhuYin symbol set;
receive a tone mark selection input from the input device.

7. An electronic device comprising:
input means for inputting information;
display means for displaying information;
means for receiving a ZhuYin symbol input from the input means;
means for providing in the display means a candidate list comprising the input ZhuYin symbol along with a Chinese character candidate list associated with the ZhuYin symbol input;
means for receiving an input from the input means, the input being related to the selection of the ZhuYin symbol included in the candidate list;
means for entering into electronic text the ZhuYin symbol based on the ZhuYin symbol selection input;
means for providing the tone marks of the ZhuYin symbol set in the display means;
means for receiving the tone mark selection input from the input means;
means for entering into electronic text a tone mark associated with the selected ZhuYin symbol, based on the tone mark selection input.

8. A computer readable medium, wherein said computer readable medium comprises computer-executable instructions stored thereon for entering ZhuYin symbols and tone marks into electronic text, by performing steps comprising:
receiving a ZhuYin symbol input from the user interface of the electronic device; providing in a display unit of the electronic device a candidate list comprising the input ZhuYin symbol along with a Chinese character candidate list associated with the ZhuYin symbol input from the user interface;
receiving an input from the user interface, the input being related to the selection of the ZhuYin symbol included in the candidate list;
entering into electronic text the ZhuYin symbol based on the ZhuYin symbol selection input from the user interface;
providing in the display unit of the electronic device the tone marks of the ZhuYin symbol set;
receiving the tone mark selection input from the user interface;
entering into electronic text a tone mark associated with the selected ZhuYin symbol, based on the tone mark selection input from the user interface.

9. The computer readable program medium of claim 8, the computer readable medium comprising a program storage medium, a record medium, a computer readable memory, a computer readable software distribution package, a computer readable signal, a computer readable telecommunications signal, or a computer readable compressed software package.

* * * * *